(12) United States Patent
McErlean et al.

(10) Patent No.: US 11,132,897 B2
(45) Date of Patent: Sep. 28, 2021

(54) METHODS, SYSTEMS, AND APPARATUSES FOR EDGE BASED NOTIFICATION THROUGH CROWDSOURCED LIVE FLEET STREAMED COMMUNICATIONS

(71) Applicant: GENERAL MOTORS LLC, Detroit, MI (US)

(72) Inventors: Donal McErlean, County Clare (IE); Joon Hwang, Pflugerville, TX (US); Geoffrey Wakefield, Lakeway, TX (US); Mason D Gemar, Cedar Park, TX (US); Scott E. Jackson, Northville, MI (US)

(73) Assignee: GM GLOBAL TECHNOLOGY OPERATIONS, LLC, Detroit, MI (US)

( * ) Notice: Subject to any disclaimer, the term of this patent is extended or adjusted under 35 U.S.C. 154(b) by 43 days.

(21) Appl. No.: 16/791,191

(22) Filed: Feb. 14, 2020

(65) Prior Publication Data
US 2021/0256846 A1    Aug. 19, 2021

(51) Int. Cl.
| | |
|---|---|
| *G08G 1/09* | (2006.01) |
| *G08G 1/0967* | (2006.01) |
| *G06N 20/00* | (2019.01) |
| *G06N 5/04* | (2006.01) |
| *H04W 4/44* | (2018.01) |
| *H04L 12/40* | (2006.01) |

(Continued)

(52) U.S. Cl.
CPC ......... *G08G 1/096708* (2013.01); *G06N 5/04* (2013.01); *G06N 20/00* (2019.01); *G07C 5/008* (2013.01); *G07C 5/02* (2013.01); *G07C 5/0816* (2013.01); *G08G 1/091* (2013.01); *G08G 1/096741* (2013.01); *H04L 12/40* (2013.01); *H04W 4/44* (2018.02); *B60R 16/0231* (2013.01); *H04L 2012/40215* (2013.01); *H04L 2012/40273* (2013.01); *H04W 84/042* (2013.01)

(58) Field of Classification Search
None
See application file for complete search history.

(56) References Cited

U.S. PATENT DOCUMENTS

2019/0139509 A1* 5/2019 Shin ................. G08G 1/096775
2021/0048815 A1* 2/2021 McErlean ............ G05D 1/0088

OTHER PUBLICATIONS

McErlean, Donal.(Aug. 16, 2019). U.S. Appl. No. 16/542,812. Method and Apparatus for Method for Predicting Automated Driving System Disengagement.

* cited by examiner

*Primary Examiner* — Julie B Lieu
(74) *Attorney, Agent, or Firm* — Lorenz & Kopf LLP

(57) ABSTRACT

Apparatuses, methods, and systems of an edge server communicating with vehicles by continuously receiving messages which include data of state transitions of Electronic Control Units (ECUs) contained in each vehicle; monitoring in real-time the streamed message data from each vehicle for detection of updates of data about state transitions of ECUs used in the vehicular operations; crowdsourcing in real-time the state transition data of the ECUs during the vehicular operations to group together state transition data having commonality as crowdsource transition data; processing, using a machine learning model, the crowdsource transition data, to classify the crowdsource transition data of an anomaly event; and transmit in advance to an identified vehicle an alert of the anomaly event in order for a driver or ADAS to execute a response.

20 Claims, 6 Drawing Sheets

(51) Int. Cl.
*G07C 5/00* (2006.01)
*G07C 5/02* (2006.01)
*G07C 5/08* (2006.01)
*B60R 16/023* (2006.01)
*H04W 84/04* (2009.01)

METHODS, SYSTEMS, AND APPARATUSES FOR EDGE BASED NOTIFICATION THROUGH CROWDSOURCED LIVE FLEET STREAMED COMMUNICATIONS

BACKGROUND

The present disclosure relates generally to an edge-based carrier network connected to a fleet of connected vehicles, and more specifically, aspects of the present disclosure relate to systems, methods, and apparatuses for collecting real-time streaming raw signal data from a fleet of connected vehicles for analysis to detect in real-time operating anomalies of nearby vehicles in order to distribute advance warnings of predicted anomalies to other vehicles in a roadway segment for corrective actions to complement sensor capabilities or to not necessitate use of sensors of each individual connected vehicle.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various advanced driver-assistance systems (ADAS), such as cruise control, adaptive cruise control, and parking assistance systems correspond to lower automation levels, while true "driverless" vehicles correspond to higher automation levels.

It is desirable to implement systems of an edge carrier network that can collect real-time streaming raw signal data of operational states of various vehicle systems from a fleet of connected vehicles within a designated control zone, analyze the data for anomalies related to vehicular systems such as hard braking, wheel slippage or stoppage, and if detected, send instructions to relevant vehicles in the area for driving warnings or, as an example instruct by a vehicle control signal an automatic emergency braking responsive action.

It is desirable to implement systems to generate warnings and ADAS instructions to a particular vehicle of incidents, operation anomalies, and the like without the use of vehicle sensors sensing the environment around a vehicle. It is desirable to provide prediction of anomalies in a vehicle path that can be discerned by communications between vehicles which unlike sensor-based detection is free from commonplace sensor operational failures such as when vehicle sensing conditions are outside of the field of view of the vehicle's own sensors, or conditions where the sensor line-of-sight is obstructed or the sensors are obscured.

The above information disclosed in this Background section is only for enhancement of understanding of the background of the invention and therefore it may contain information that does not form the prior art that is already known in this country to a person of ordinary skill in the art.

SUMMARY

Disclosed herein are autonomous vehicle control systems, training systems and related control logic for autonomous vehicle control, methods for operating such systems, and motor vehicles equipped with onboard control systems. By way of example, and not limitation, there is presented a motor vehicle with onboard vehicle machine learning and control systems using crowdsourced data from a fleet of vehicles for predicting anomalies in vehicular operations.

In an exemplary embodiment, an apparatus including a processor at an edge server in communication with one or more vehicles in a fleet is provided. The apparatus is operative to communicate and maintain a continuous communication link between one or more vehicles of the fleet to receive a plurality of messages wherein the plurality of messages includes a continuous stream of message data which includes data of state transitions of Electronic Control Units (ECUs) contained in each vehicle in a fleet of vehicles while executing vehicular operations in a vicinity; monitor in real-time the streamed message data from each vehicle for detection of updates of data about state transitions of ECUs used in the vehicular operations wherein the data of each state transition of the ECUs is reported by an advanced driver assistance system (ADAS) contained in each vehicle to the edge server; crowdsource in real-time a set of data of the state transitions or of various levels of operations of ECUs of ECUs during the vehicular operations of each vehicle in communication with the edge server to group together state transition data having a degree of commonality as crowdsource transition data; process, by application of a machine learning model, the crowdsource transition data, to classify crowdsource transition data indicative of an assisted driving system anomaly event; and transmit a message in advance to an identified vehicle likely to incur the assisted driving system anomaly event in order for a driver or ADAS to execute a response.

In various exemplary embodiments, the apparatus further includes the processor at the edge server in communication with the one or more vehicles in a fleet further operative to: simulate an assisted driving system algorithm over a predicted route segment for an identified vehicle to generate a simulation result; predict a predicted assisted driving system anomaly event within the predicted route segment based on an analysis of the crowdsource data and the simulation result. The apparatus further includes the processor at the edge server in communication with the one or more vehicles in a fleet further operative to send a user alert of the predicted assisted driving system anomaly event before the identified vehicle while executing vehicular operations incurs the predicted assisted driving system anomaly event. The apparatus further includes the processor at the edge server in communication with the one or more vehicles in a fleet further operative to broadcast a warning message in response to the predicted assisted driving system anomaly event to vehicles in the vicinity. The apparatus further includes the processor at the edge server in communication with the one or more vehicles in a fleet further operative to monitor one or more key parameters related to vehicular operations of each vehicle in the fleet. The identified vehicle likely to incur the assisted driving system anomaly event is traveling behind a vehicle that has already incurred the assisted driving system anomaly event. The apparatus further includes the processor at the edge server in communication with the one or more vehicles in a fleet further operative to receive transition state data indicative of a prior assisted driving system anomaly event of a vehicle of the fleet traveling a route segment in the vicinity and wherein the assisted driving system anomaly event is predicted based on or in response to the prior assisted driving system anomaly event. The message data is transmitted via an MQ Telemetry Transport (MQTT) and a Data Distribution Service (DDS) wireless protocol on a cellular network. The apparatus further includes the processor at the edge server in communication with the one or more vehicles in a fleet further operative to send via a reverse path the message about the assisted driving system anomaly event by to the cellular protocol to a messaging client at the vehicle to transmit on a Controller Area Network (CAN) bus to an ADAS controller of the vehicle to perform a control action on an ECU contained in the vehicle. The degree of commonality includes at least a vehicle location and vehicle speed towards an assisted driver system anomaly event location.

In another embodiment, a method performed by a processor is provided. The method includes communicating a plurality of messages between a processor at an edge server and one or more vehicles in a fleet; maintaining a continuous cellular link between the processor at the edge server and the one or more vehicles of a fleet for receiving the plurality of messages wherein the plurality of messages include a continuous stream of message data which includes data of state transitions of ECUs contained in each vehicle in a fleet of vehicles during vehicular operations; monitoring in real-time the streamed message data from each vehicle for detection of updates of data about state transitions of ECUs used in the vehicular operations wherein the data of each state transition of the ECUs is reported by an advanced driver assistance system (ADAS) contained in each vehicle to the edge server; crowdsourcing in real-time a set of data of the state transitions or of varying levels of operations of ECUs of ECUs during the vehicular operations of each vehicle in communication with the edge server to group together state transition data having a degree of commonality as crowdsource transition data; processing, by application of a machine learning model, the crowdsource transition data, for classifying crowdsource transition data indicative of an assisted driving system anomaly event; and transmitting in advance a message to an identified vehicle likely to incur the assisted driving system anomaly event in order for a driver or ADAS to execute vehicle control action.

In various exemplary embodiments, the method further includes simulating by the processor, an assisted driving system solution over a predicted route segment for an identified vehicle to generate a simulation result; and predicting a predicted anomaly event within the predicted route segment in response to the crowdsource data and the simulation result. The method further includes sending a driver alert of the predicted anomaly event before the identified vehicle incurs the predicted anomaly event wherein the driver alert is indicative of a probability of the predicted anomaly event. The method further includes broadcasting, via a cellular network by the processor, a warning message in response to the predicted anomaly event to vehicles in the vicinity.

The method further includes monitoring one or more key parameters related to vehicular operations of each vehicle in the fleet. The identified vehicle likely to incur the anomaly event is traveling behind a vehicle that has already incurred the anomaly event. The method further includes receiving transition state data indicative of a prior anomaly event of a vehicle of the fleet traveling a route segment in the vicinity and wherein the anomaly event is predicted in response to the prior anomaly event. The message data is transmitted via an MQTT and a DDS wireless protocol on a cellular network. The method further includes sending via a reverse path the message by the processor about the anomaly event by the cellular protocol to a messaging client at the vehicle to transmit on a CAN bus to an ADAS controller of the vehicle to perform a control action on an ECU contained in the vehicle.

In yet another embodiment, an advanced driver assistance system for controlling a vehicle is provided. The system includes a processor at an edge server in communication with one or more vehicles in a fleet operative to: communicate and maintain a continuous communication link between one or more vehicles of a fleet to receive a plurality of messages wherein the plurality of messages includes a continuous stream of message data which includes data of state transitions of ECUs contained in each vehicle in a fleet of vehicles while executing vehicular operations in a vicinity; monitor in real-time the streamed message data from each vehicle for detection of updates of data about state transitions of ECUs used in the vehicular operations wherein the data of each state transition of the ECUs is reported by an advanced driver assistance system (ADAS) contained in each vehicle to the edge server; crowdsource in real-time a set of data of the state transitions or of various levels of operations of ECUs during the vehicular operations of each vehicle in communication with the edge server to group together state transition data having a degree of commonality as crowdsource transition data wherein the degree of commonality includes at least the vehicle location, vehicle speed towards the vicinity of the anomaly location; process, by application of a machine learning model, the crowdsource transition data, to classify crowdsource transition data indicative of an assisted driving system anomaly event; and transmit in advance a message to an identified vehicle likely to incur the assisted driving system anomaly event in order for a driver or ADAS to execute a response.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

Figure 1:
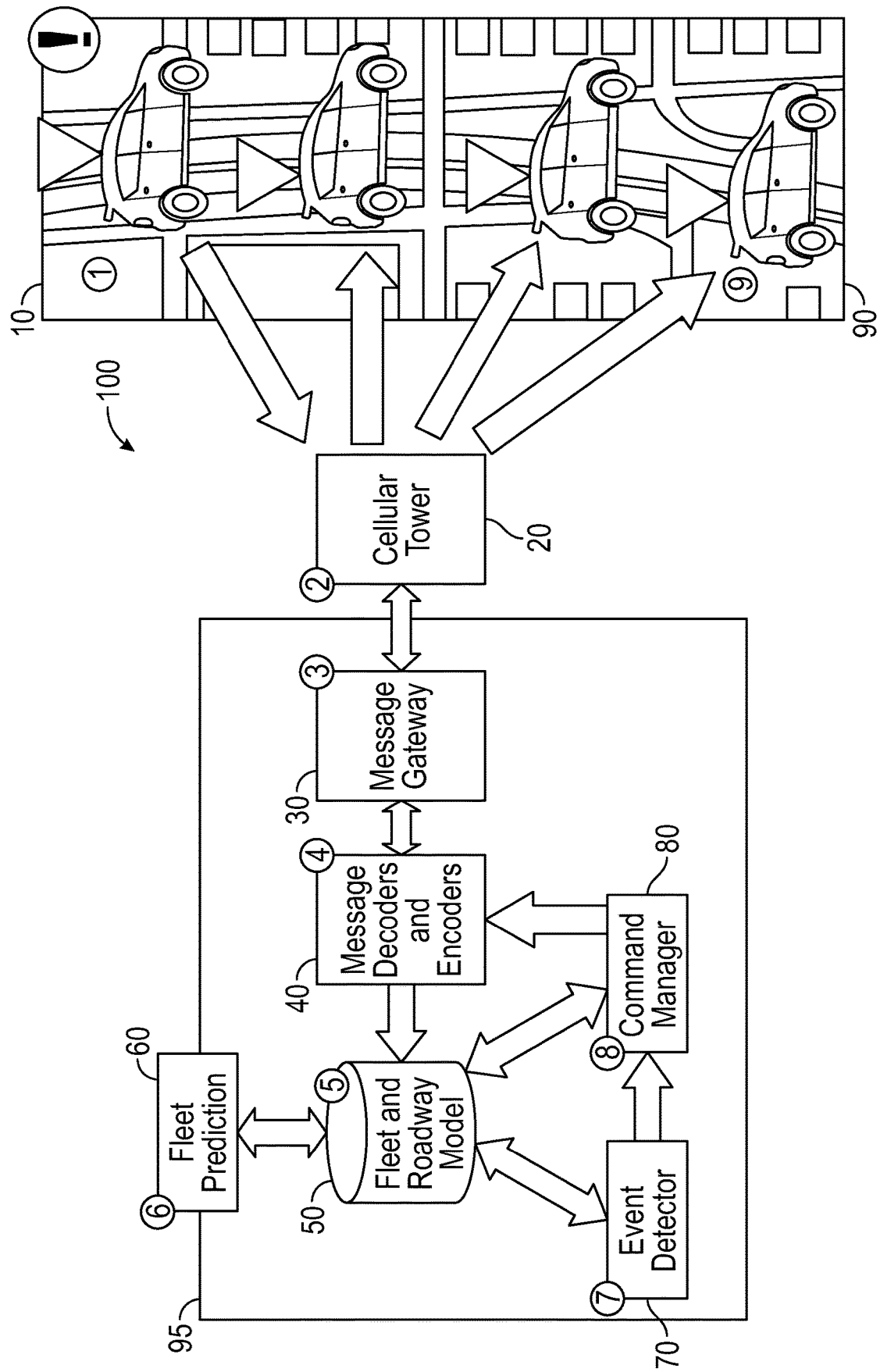
FIG. 1 schematically illustrates a diagram of a crowdsourced communication system for collecting streaming raw signal data from a fleet of connected vehicles in accordance with various embodiments.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Various nomenclature is used throughout the present disclosure, for example, including a Controller Area Network (CAN) is a vehicular bus standard to enable devices and controllers to communicate with each other without an identified computer. The CAN bus acts as a central networking system that allows different Electronic Control Units (ECUs) of vehicles to communicate with each other ECUs. It is contemplated that not only can the present system be implemented with a CAN configuration for communications between vehicles but also CAN FD (CAN with flexible data rate) may also be used in a similar manner. CAN FD increases the bandwidth requirements within automotive networks. The CAN FD protocol has brought the software closer to "real-time" through the minimization of delays between instruction and transfer of data (latency) and higher bandwidths.

The present disclosure describes various exemplary embodiments that provide processes using an on-vehicle processor streaming vehicle bus (CAN/LIN/Flex ray other) to stream signals over the air in a continuous manner through a vehicle modem. Further, an edge-based system located at a Telco carrier edge receives signals and detecting or determines anomalies, such as large changes in velocity (hard braking), optionally with crowdsourcing algorithms. The edge-based system then builds graphs or models of vehicle relationships, and continuously monitors for incidents, and will generate and send appropriate warnings and/or commands to relevant vehicles in the vicinity of the incident. The on-vehicle processor of the vehicle will receive commands and instruct the ECU to display the FCA or instruct ADAS ECU to take action.

In various exemplary embodiments, the present disclosure describes directly streaming CAN/vehicle signals to edge compute for inference where the centralized crowdsourced data collection occurs at an edge server rather than occurring locally between vehicle to vehicle systems. Also, computing at edge server locations that exhibit low-latency carrier radio network access, and synchronous fleet predictions using Kalman filtering, as well as contextual filtering of commands via artificial intelligence solutions including neural networks at the edge server to send to relevant vehicles based on the vehicles current navigation direction and historical data about the vehicle operation.

FIG. 1 schematically illustrates a diagram of a crowd-sourced communication system for collecting streaming raw signal data from a fleet of connected vehicles in accordance with various embodiments. In FIG. 1, the communication system 100 of the connected fleet is configured in the cellular domain by an edge server 95 of a carrier network that enables the collecting and aggregating of real-time streaming raw signal data from a fleet of connected vehicles (i.e. connected vehicle 10, connected vehicle 90) within a designated control zone. The edge server 95 can analyze the collected data for various anomalies such as hard braking, wheel slippage, stoppage, and so on. If an anomaly is detected, the communication system 100 is configured to send an instruction (i.e. CAN message) or in multiple instructions to relevant vehicles for alerting the driver of each relevant vehicle about a particular driving warning such as the need for automatic emergency braking, and the like or to instruct the advanced driver assistance systems (ADASs) to change a feature state of a ECU system in the vehicle at an appropriate time and location determined by the detected anomaly on a road segment and current vehicle speed, location and path.

As illustrated in FIG. 1, the raw CAN messages are continuously streamed off (i.e. transmitted) vehicles 10 to the cellular network 20 and back to the vehicle 90 over a continuously connected messaging protocol such as MQTT or DDS. The message from the vehicle 90 is directed by the cellular network 20 to the nearest edge server (i.e. edge server 95) that controls the geographic area in which the vehicle 90 is located. That is, once the vehicle 90 is outside the geographic area of a particular edge server, the message from the vehicle 90 would be a handoff to another edge server that controls the other geographic area where the vehicle 90 is now located. The messages are subsequently received or transmitted via the message gateway broker 30 (located within the edge server 95) that acts as an interface between the edge server components and the cellular network 20 (i.e. the cellular tower). Each CAN message received via the message gateway broker 30 is decoded and/or encoded at the message decoder/encoder 40. When the message is decoded at the message decoder/encoder 40, the values extracted from the message are written into in-memory digitally of at least a set of twin vehicles of a fleet of vehicle and roadway model 50. That is, the fleet and roadway model 50 distribute the decoded messages to the relevant vehicles where the relevancy of a vehicle is determined based on an identified or parameters including vehicle location, vehicle direction, time of the message extracted, type of information gleaned from the decoded message, etc. For example, a set of key parameters of vehicles in fleet can be predicted 60 based on the data extracted and processed by the fleet and roadway model 50 or can be continuously predicted in absence of and/or in between updates from the vehicle 90 (e.g. Kalman filtering) that results in making predictions of vehicles' current location, roadway locations, and vehicle heading directions. The event detector 70 processes vehicle states which have been analyzed to respond to anomalies. For example, this can include a hard braking or a stoppage and the corresponding hard braking state or stoppage state of the vehicle 10. Upon recognition of a vehicle state (i.e. a detection of a changed vehicle feature state), a notification can be generated and sent to a command manager 80 which in turn sends notifications to alert via broadcasting CAN messages nearby vehicles in the vicinity to have advanced knowledge of a responsive action taken to anomaly and to anticipate or alert the driver of potentially required action to be taken if applicable to the vehicle. The command manager 80 reviews nearby vehicles from the in-memory database by a spatial query, and selects vehicles traveling behind the anomaly event on the same roadway. The commands sent by the command manager follow a path or processing pipeline via the message decoder/encoder 40 to the message gateway broker 30, exiting the edge server 95 via the cellular network 20 and communicating the command to the vehicle ADAS or the driver of the vehicle 90. Also, vehicle 90 can notify the driver or ADAS upon receipt of CAN message.

Hence, the ADAS is operative to perform a methodology to predict a future feature state of an automatic driving system (i.e. ECU) to provide drivers with early feedback and improve the user experience. The methodology is operative to predict anomalies based on the crowdsourced fleet data that results in improvements in ADAS state analytics dynamic path and speed profile shaping in an ADAS equipped motor vehicle. The methodology may use a model trained using the crowdsourced data collected from the automated driving fleet, finding micro patterns at a road segment level, and macro patterns independent of location. The method may then model anomalies found by crowdsourcing in the vehicle driving operation in future segments of the predicted vehicle path, and send advance warnings of feature state transitions or CAN messages as the vehicle continues operation to the next road segments.

In various exemplary embodiments, key parameters (i.e. parameters defined in CAN messages) of vehicles in the fleet can be continuously predicted in the absence or in between updates by implementing factorial formulation which allows for inference on-road segments which have not previously been encountered where the inference is based on the crowdsourced fleet data. For example, Factorial Hidden Markov Models (FHMM) may be employed by treating sequences of individual feature states of ECUs responsive to conditions such traffic, weather, construction, and/or road segment, as dependent only on the previous state of that feature and the current observation as dependent only on the current state of all features. FHMM allows for a distributed representation of features and allows for prediction even when data is incomplete, such as when driving on a previously un-recorded road segment or in unknown weather conditions. This Bayesian approach allows for the inherent capture of uncertainty due to missing or incomplete information. The output of an FHMM includes information about the level of confidence the model has in any prediction by current state fleet observations in order to determine likely future states.

Figure 2:
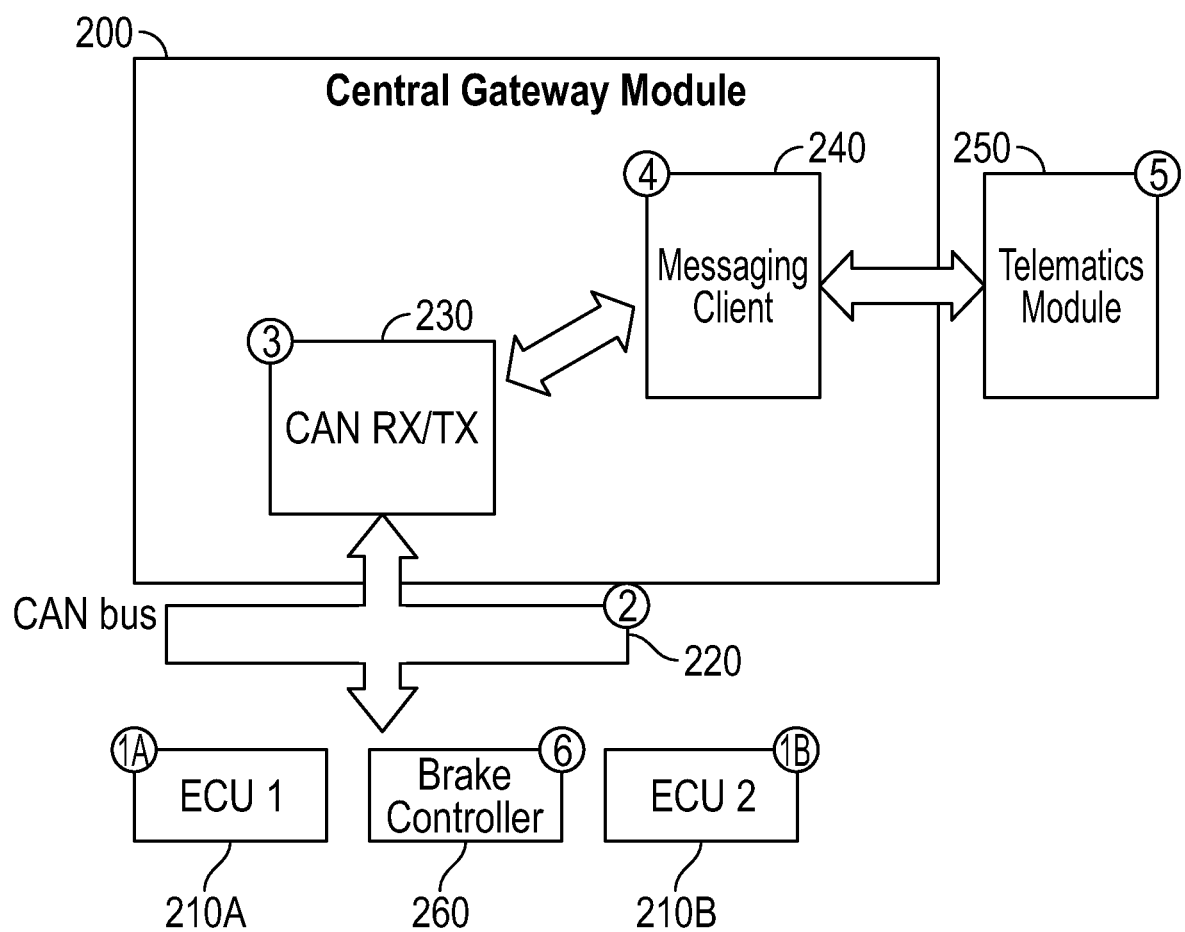
FIG. 2 illustrates an exemplary diagram of a system with a central gateway module associated with a vehicle where a primary anomaly detection occurs at an edge in a cellular network between vehicles in accordance with various embodiments.

Turning now to FIG. 2, a block diagram illustrating an exemplary implementation of a system with a central gateway module for predicting anomalies based on crowdsourced communications between vehicles in accordance with various embodiments. The central gateway module 200 is configured with various onboard systems including an interface 220 (i.e. CAN bus) that receives CAN messages about states of vehicular systems (e.g. the wheel speed, location (GPS), the brake pressure) which are placed onto a CAN bus by various ECUs (210a, 210b) and/or brake controller or ADAS controller 260 in a cyclic manner. The CAN messages are received to a CAN message transmitter/receiver module 230 that is configured as a software component in the central gateway module 200 that encodes the CAN message for transmission to vehicles deemed related based on location, direction, anomaly type decoded from the CAN message, etc. In turn, the CAN message is received and transmitted by a messaging client 240 via telematics module 250 associated or integrated with a vehicle wherein the vehicle is configured to operate transmissions and receptions of wireless signals using MQTT or DDS or an equivalent.

In instances of vehicular operation where there is a reverse-path notification via the telematics module 250, the notification is first received by the telematics module 250 (from the edge server (not shown)) and transmitted to the messaging client 240 at the central gateway module 200 located at the vehicle. The (CAN) transmitter/receiver module 230 receives the message (decoded) from the messaging client 240 and sends a CAN message onto a CAN bus 220 to the vehicle ADAS controller 260. As an example, the CAN message may include parameters for configuring the vehicle ADAS by transitioning various ECUs (210a, 210b) feature states instructed by the ADAS controller 260. That is, the ADAS controller 260 may act upon the CAN message or the other ECU may act on it and may also deliver a Human Machine Interface (HMI) alert In instances of vehicular operation where there is a forward path notification, the CAN message(s) from the vehicular ADAS controller 310260 and changes of states of the ECUs (210a, 210b) are sent or broadcast to the vehicle(s) via the telematics module 250. In this case, CAN messages are generated and sent from the ADAS controller 260 onto the CAN bus 220 to the message transmitter/receiver module 230 as CAN message and configured by the messaging client 240 (i.e. encoded) to transmit and send from the central gateway module 200 to the telematics module 250. The telematics module 250 can broadcast the message to vehicles in the vicinity or can send the message to the edge server for crowdsourced analysis.

While the ADAS controller 260 in each vehicle is also likely coupled and operative to use and receive instructions based on data derived from the various sensors implemented in the vehicle itself for sensing the vehicle surroundings, the responses instructed to the ADAS controller 260 via the telematics module 250 are based on crowdsourced data analysis of groupings of vehicle systems (i.e. for example clustering of state changes of sets of vehicle systems) rather than the individual raw data sensed by each vehicle's set of sensors. For the described crowdsource fleet communication system for detecting anomalies in the vehicle operations, there is neither any reliance or use of the raw sensor data by each set of individual sensors in the vehicle in configuring the CAN messages transmissions of the central gateway module 200. In the present instance, the CAN messages are generated based on continuous monitoring of event data of vehicle states which are analyzed in an aggregate manner (i.e. for crowdsourced detection) for vehicular operational anomalies while sets of vehicles are operating in a locality and the analysis is performed at a centralized location. For example, the analysis can be performed at the nearest edge server where the anomalies can be detected, distributed and/or broadcast to other vehicles, or other cloud-connected locations with analytics engines and capable of communicating via the cellular protocols instituted between the telematics module 250 and vehicles in the fleet.

Figure 3:
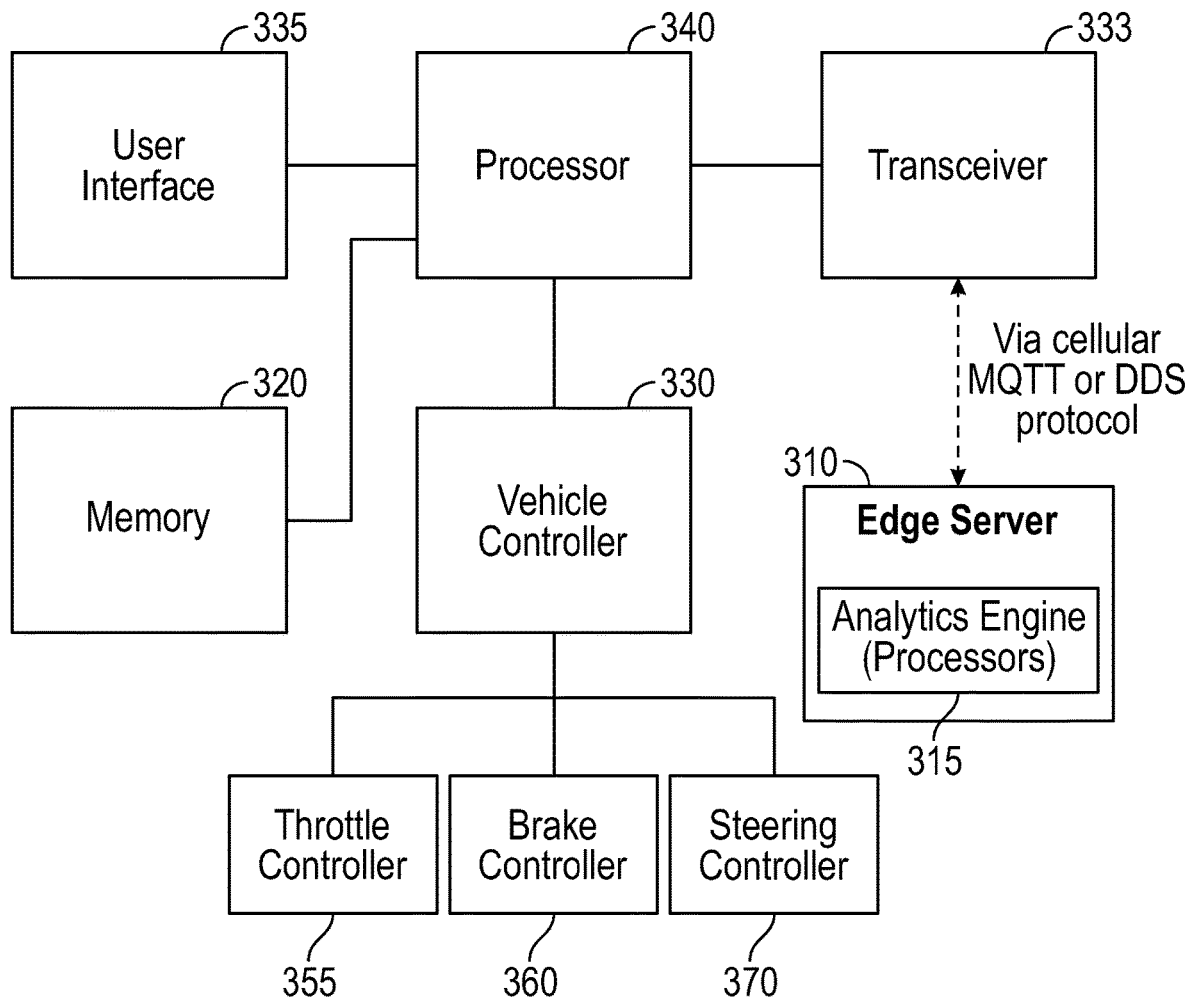
FIG. 3 illustrates an exemplary diagram of the architecture of vehicle control components in communication with an edge server for determining anomalies based on analysis of crowdsourced data in accordance with various embodiments.

FIG. 3 illustrates an exemplary architecture of vehicle control components in communication with an edge server for determining anomalies based on crowdsourced data in accordance with various embodiments. The user interface 335 (i.e. HMI) may be a user input device, such as a display screen, light-emitting diode, audible alarm or haptic seat located in the vehicle cabin and accessible to the driver. Alternatively, the user interface 335 may be a program running on an electronic device, such as a mobile phone, and in communication with the vehicle, such as via a wireless network. The user interface 335 is operative to collect instructions from a vehicle operator such as initiation and selection of an ADAS function, desired following distance for adaptive cruise operations, selection of vehicle motion profiles for assisted driving, etc. In response to a selection by the vehicle operator, the user interface 335 may be operative to couple a control signal or the like to the processor 340 for activation of the ADAS function. Further, the user interface may be operative to provide a user prompt or warning indicative of an upcoming anomaly in-vehicle operation on a vehicle path that affects the ADAS function or a request such as a need for the user to more take over control of the vehicle due to a safety issue (e.g. unsafe weather condition, etc.) or a likely anomaly of an assistance vehicle driving function.

The transceiver 333 is operative to transmit and receive data via a wireless network (i.e. cellular network) to an edge server 310 (i.e. a local central server or a cloud server connected to the cellular network). The transmitted CAN message data may include instances and locations where an anomaly type event has occurred during ADAS operation based on analysis of communications between vehicles in a fleet. This CAN message data may be transmitted by the transceiver 333 in response to a request or periodically, or after one or more anomalies. The transceiver may be further operative to receive CAN message data from the edge server indicative of locations of anomalies, other ADAS operating state transitions, and/or other crowdsourced data (i.e. derived fleet CAN message data from various ECUs of vehicles in the fleet in the vicinity), such as weather, road conditions, obstacles, obstructions, construction sites, traffic and the like which may be used to predict an ADAS state transition, such as an anomaly event.

In an exemplary embodiment, the processor 340 is operative to receive the CAN message data streamed in real-time from the transceiver 333 located at the vehicle and to receive instructions for various ADAS operating state transition predictions based on analytic algorithms performing predictive analysis based on current and historic crowdsourced data where the predicted transition states for the ADAS of the vehicle are derived at a remote edge server 310. This is because the remote edge server is configured to communicate continuously and collect streamed data from multiple vehicles (i.e. a real-time streamed crowdsourced vehicle data communication and collection). In one instance, the processor 315 at the edge server 310 is programmed to model vehicle operations and to simulate or model control of the vehicle traversing a number of upcoming route segments in which the vehicle is to be navigated by motion planning and autonomous driving systems of the vehicle itself with ADAS operation. The key parameters of each vehicle necessary to perform the autonomous or assisted driving operations of each vehicle in the fleet are continuously being predicted by the processor 315 at the edge server which acts as an analytics engine continuously analyzing changes in the vehicle states for anomalies by crowdsourced clustering of the data, other analytical solutions, or various machine learning applications on the determined or predicted route segments. Further, in an alternate exemplary embodiment, the processor 340 which is contained in the vehicle can be implemented to receive data act from in-memory database 320 communicated by the processor 315 at the edge server 310. In response to the modeling, the processor 315 is operative to generate a prediction indicative of a probability of encountering in advance of the anomaly by the vehicle based on factors that include timing, distance, speed, weather conditions of the environment of the vehicle or grouping of factors of the multiple vehicles traveling behind.

If the probability of an anomaly is deemed high (e.g. a threshold value may be associated with an anomaly event detection as indicative of a probability high enough to alert the vehicle operator or instruct the ADAS), a user prompt or warning is generated in advance and communicated via the cellular network to the user interface 335. For example, if the processor 340 determines that an anomaly is likely within a certain distance from the cellular communication received via the transceiver 333, a user prompt may be provided to the user interface 335 so that ECU systems of the vehicle runs smoothly and the vehicle operator has enough time to safely engage or change the appropriate vehicle controls. This data may also be used by the processor 315 for (supervised) training of a learned road segment model (i.e. a machine learning model for instructing ADAS) based on crowdsourced data.

The vehicle controller 330 may generate control signals for coupling to other vehicle system controllers, such as a throttle controller 355, a brake controller 360 and a steering controller 370 in order to control the operation of the vehicle in response to the ADAS algorithm instructions provided. The vehicle controller 330 may be operative to adjust the speed of the vehicle by reducing the throttle via the throttle controller 355 or to apply the friction brakes via the brake controller 360 in response to a control signal generated by the processor 340. The vehicle controller 330 may be operative to adjust the direction of the vehicle controlling the vehicle steering via the steering controller 370 in response to control signals generated by the processor 340.

Figure 4:
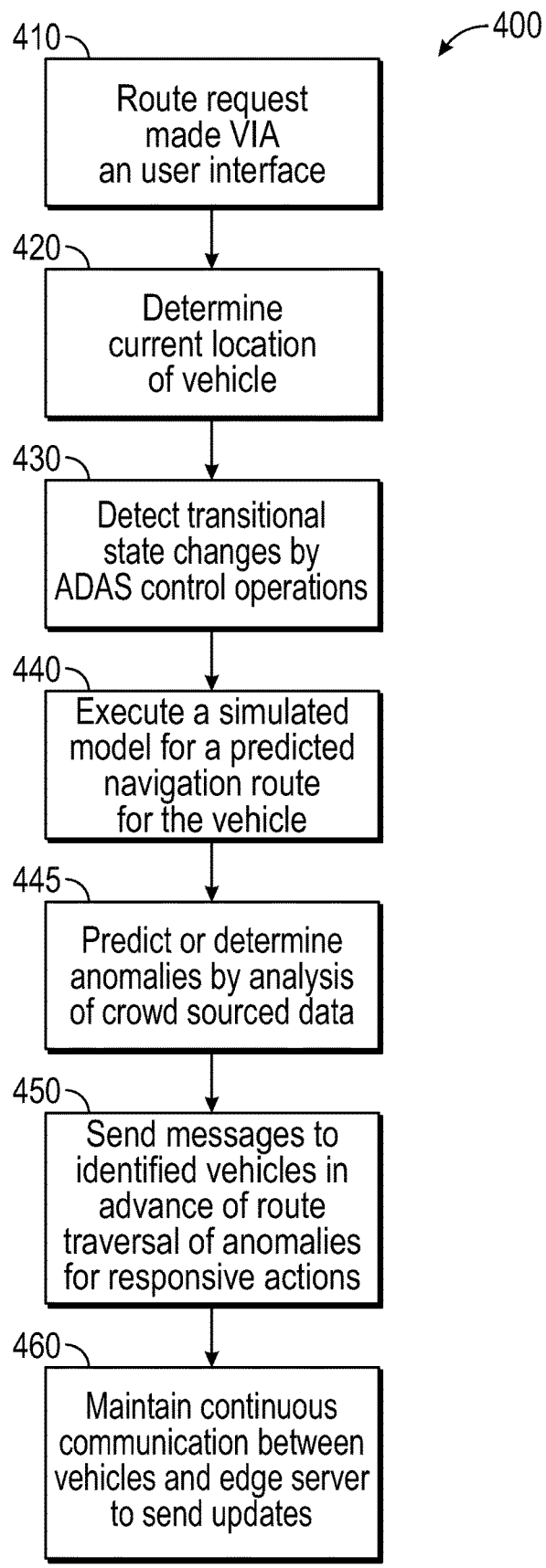
FIG. 4 illustrates an exemplary flow chart of a method for predicting anomalies on a roadway in advance based on communications between vehicles in a fleet by analysis of crowdsourced data in accordance with various embodiments.

Turning now to FIG. 4, a flow chart illustrating an exemplary implementation of a method 400 for predicting anomalies on a roadway in advance based on communications between vehicles in a fleet via crowdsourced data in accordance with various embodiments. The method is the first operative to receive 410 a route request via a user interface or via a wireless transmission (e.g. cellular transmission). The route request may be indicative of a destination or may be indicative of a destination with a preferred route. The route request may further be an initiation of an ADAS function, such as adaptive cruise control, or other ECU settings in response to a user request via a user interface or in response to CAN messages transmitted to the vehicle via a telematics module from the nearest edge server.

The method is next operative to determine 420 the current location of the vehicle. The method may determine this location in response to a GPS received output and/or high definition map data or the like. In response to the current location of the vehicle, the method may be operative to generate a route between the current location and the destination in response to stored map data and data received via a wireless network. The map data and the received data may be indicative of roadways, traffic data, weather conditions, construction information, and the like. The route may be divided into route segments wherein the ADAS system is operative to navigate the vehicle through each of the route segments sequentially.

The method is next operative to perform 430 an ADAS operational change that is responsive to an environment, condition, etc. found in a motion path modeled 440 by a predictive navigational algorithm. In performing the ADAS operation, the method is operative to determine or predict an anomaly on a route while navigating a predicted navigation path on a route segment. For example, in response to an environment condition in the navigated route segment, a determined command responsive to the upcoming anomaly based on analysis of crowdsourced vehicular data at an analytics engine at a remote edge server is sent in advance to a vehicle where a CAN message is delivered to various ECU systems of the ADAS of the vehicle to correct or respond in advance to the anomaly which has been predicted in the upcoming route segment. Hence, the crowdsourcing of data collected of vehicles in the locality or vehicles traversing the determined route is applied to predictive model on the motion path modeled and is used as the basis to predict further anomalies for the vehicle in while on route and on route to the next route segment to adjust various ECUs of the operating vehicle.

In various exemplary embodiments, the method can be implemented to determine a threshold 445 for determining an anomaly or for comparison of an anomaly type to respond to in the motion path based on a clustering of a number of vehicle incurring a state change in various ECU systems for the control of the vehicle in the upcoming segment. The threshold may be applicable to how much an ECU is required to transition states to respond to the upcoming anomaly.

Additionally, for the ADAS operation, the method is further operative to perform a predictive navigational algorithm (using a machine learning model) in order to predict if an anomaly event may be likely in an upcoming route segment. The method is operative to receive a predictive (simulation) models generated from crowdsourced data (e.g. the data is streamed in real-time by a number of vehicles in the fleet) related to the upcoming route segments. The method is next operative to simulate a virtual-navigation by the vehicle of an upcoming segment in order to predict another anomaly in advance.

In an exemplary embodiment, using the received state data of ECUs and/or current streamed state data of ECUs ahead of the present vehicle for configuring various ECUs of the vehicle or for warning 450 the driver in the upcoming route segment, the method is operative to build at the edge server an FHMM model or other type of AI model using features such as anomalies detected, location, weather, road segment, road type, map version, construction, ambient traffic, and road material. This model may be used to capture transitions between feature states along the road segment and state changes dependent upon those features of various ECUs as the vehicle traverses the road segment.

The method is operative to generate or broadcast a user warning 450 indicative of the anomaly via messages. The user warning may be displayed via a user interface and may be indicative of a probability, or likelihood, of the anomaly occurring and the distance of the vehicle to the anomaly event. For example, the user interface may be a plurality of light-emitting diodes that change color in response to the probability of the anomaly event occurring and/or the distance to the probable anomaly event. The method may couple this user warning, score and/or probability and location to the ADAS or the vehicle control system for use by the ADAS. The method may then be operative to simulate the next segment wherein the number of route segments simulated ahead of the vehicle location may be determined dynamically by, for example, distance and speed, or another design requirement.

Additionally, the prediction information may be sent to a local edge server via wireless transmission (cellular) when either the state changes or a certain distance/time has elapsed. If the state has changed, and an efficient learning algorithm on the edge server may update 460 a state transition model in the data to be transmitted to other vehicles expecting to navigate the route segment. A cloud application on the edge server may simulate a vehicle driving down learned virtual road model to determine if state change likely. The cloud algorithm may use the Forward-Backward algorithm for the FHMM to perform belief propagation prediction on the next n road segments where n can be determined dynamically by, for example, distance and speed. Because of the factorial nature of the FHMM, the cloud model may use partial knowledge to make predictions about state-change likelihoods on-road segments that haven't previously been encountered. If the cloud application determines that a change in the ADAS state is likely in response to segment conditions, the could application may update the information supplied to the vehicle indicating the probability of the change in operational states of the ECUs.

Figure 5:
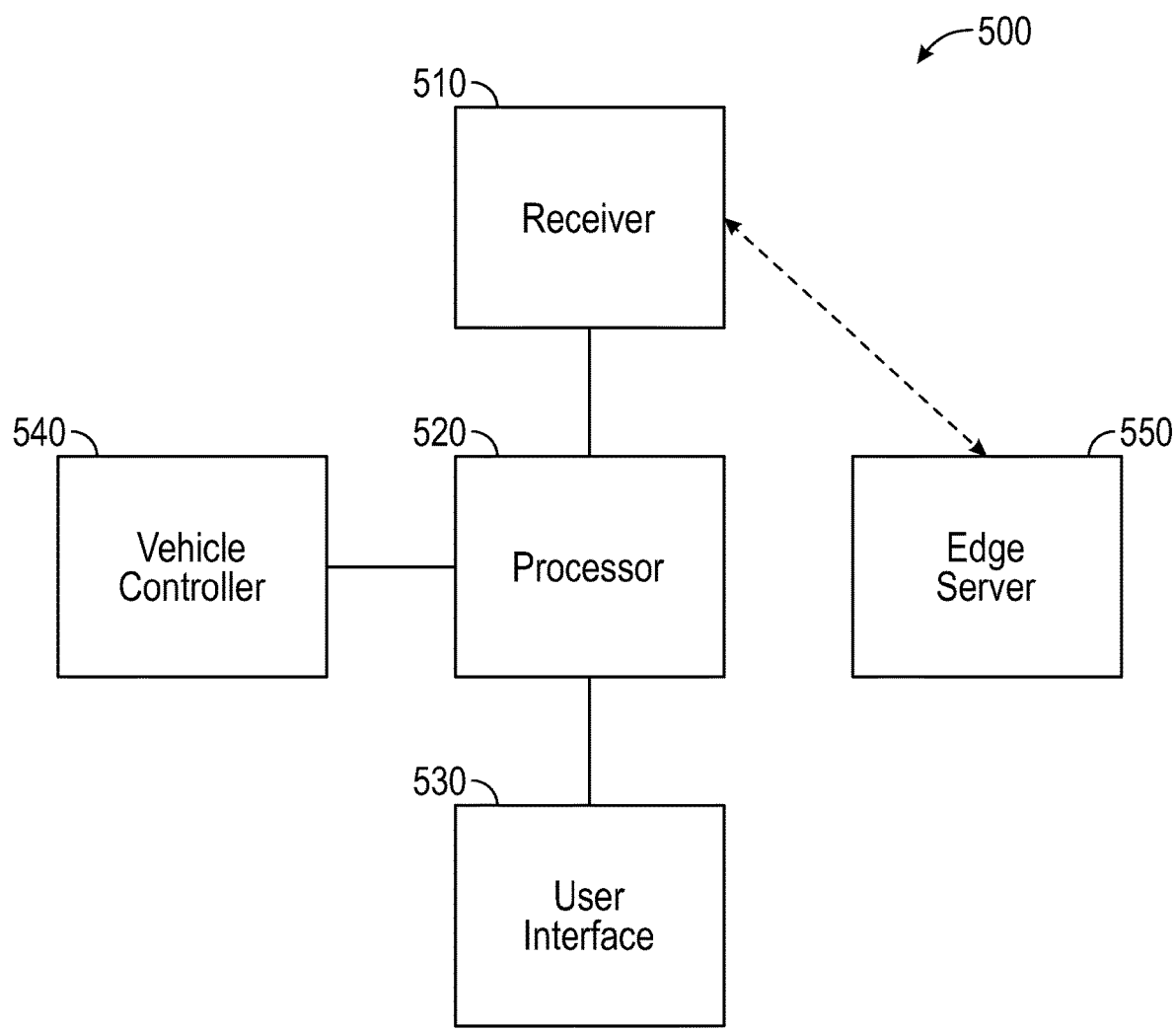
FIG. 5 illustrates an exemplary block diagram of a system for predicting automated driving system anomalies by analysis of crowdsourcing fleet data in a vehicle is shown.

Turning now to FIG. 5, a block diagram illustrating another exemplary implementation of a system 500 for predicting automated driving system anomalies via crowdsource fleet data in a vehicle is shown. The system may be an advanced driver assistance system for controlling an identified vehicle having a transceiver 510, a processor 520, a user interface 530, and a vehicle controller 540.

The transceiver 510 may be a radio frequency transceiver, such as a cellular network device, operative to transmit and receive data over a cellular data network to a remote edge server. In this exemplary embodiment, the transceiver 510 is operative to receive data indicative of an assisted driving system anomaly event provided by a first vehicle. The data may be generated in response to a large number of anomalies detected and transmitted by a plurality of vehicles. The model may then be used to predict an anomaly event in response to an identified vehicle dynamic. In an exemplary embodiment, the anomaly event is determined in response to a request by an ADAS.

The exemplary system 500 further includes a processor 520 operative to simulate an ADAS algorithm based on the crowdsourced data analysis at the edge server 550 over a multiple route segments to generate a predicted or simulated result, the processor being further operative to predict a predicted anomaly event within future route segments in response to the either individual or crowdsourced vehicle state data and the simulation result and to generate a warning control signal in response to the predicted anomaly event. The processor 520 may be further operative to generate a route in response to a destination and an identified vehicle location and to determine the first route segment and another or predicted route segment in response to the route and to generate a first motion path in response to the first route segment and to couple the first motion path to the vehicle controller 540 for controlling the vehicle over the first route segment.

The exemplary system 500 may further include a user interface 530 to present a user alert or messages of the predicted anomaly event in response to the warning control signal before the identified vehicle reaches a next route segment. The user interface 530 may be a display screen within a vehicle cabin, maybe one or more light-emitting diodes, a haptic seat, and/or an audible alarm.

In an exemplary embodiment, predicted anomaly event may be predicted using a machine learning model configured at the edge server 550 using models including a factorial hidden Markov model, a filtering model, a regression or classification model or a neural network that continuously evaluates the crowdsourced data communicated by the vehicles in the vicinity to processors at the edge server. Further, each machine learning model may be trained using crowdsourced data collected from an automated driving fleet facilitating finding micro patterns at the road segment level, and macro patterns independent of location. The processor 520 is operative to simulate the operation of a virtual vehicle along a route segment and scoring all the models. Each model can allow for inference on-road segments which have not previously been encountered.

The system may further include a vehicle controller 540 operatives to control an identified vehicle over the first route segment in response to an ADAS algorithm, such as an adaptive cruise control algorithm. The predicted anomaly event is predicted using a machine learning model using the crowdsourced data and data from the vehicle controller 540 for the analysis. The vehicle controller may be operative to transmit current feature data to the processor 520 and to receive control instructions from an ADAS controller. In an exemplary embodiment, the processor 520 is also the ADAS controller. The vehicle controller may control the identified vehicle by controlling a steering controller, brake controller, and/or throttle controller.

Figure 6:
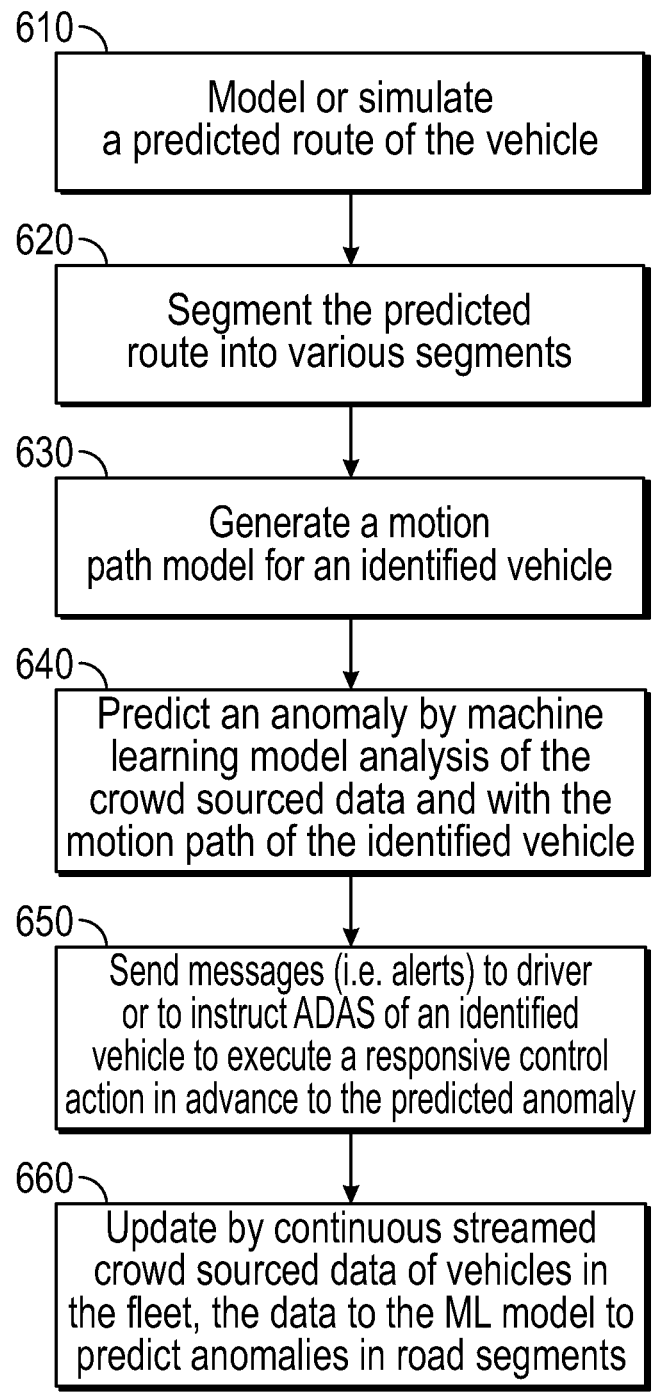
FIG. 6 illustrates an exemplary flow chart for predicting automated driving system anomaly based on the analysis of crowdsourced data in accordance with various embodiments.

Turning now to FIG. 6, a flow chart illustrating an exemplary implementation of a system for predicting automated driving system anomaly based on crowdsourced data in an identified vehicle in accordance with various embodiments. The exemplary method 600 is the first operative to calculate 610 a route between an identified vehicle location and a destination. The identified vehicle location may be determined in response to a global positioning system measurement indicative of a current location of the identified vehicle. The identified vehicle location may be further determined in response to map data stored within a memory within the identified vehicle. The destination may be determined in response to user input or in response to a signal received via a wireless network. The route may be calculated using map data, current traffic, weather, user preferences, vehicle characteristics and the like.

The method is next operative to segment 620 the route into at least a first route segment and another or second route segment. The route may be segmented into a number of segments, wherein a segment length may be determined in response to an identified vehicle speed, an identified vehicle location, road characteristics, and road conditions. In this exemplary embodiment, the first second and the second segment may be separated by an additional plurality of segments wherein the number of the additional plurality of segments may be established in response to a identified vehicle speed, a identified vehicle location, road characteristics and road conditions such that a sufficient amount of time may be provided between an anomaly event warning and a driver safely resuming driving operations.

The method is next operative to generate 630 a first motion path for the first route segment and controlling the identified vehicle over the first route segment. The first motion path is generated by an ADAS algorithm and is a path in which the identified vehicle will be controlled through the first route segment. The first motion path is generated in response to the current identified location, destination, detection proximate objects, map data, and the like.

The method next generates 640 another or predicted motion path for the next route segment and simulating a simulated identified vehicle operation over the predicted route segment. The method is then operative to predict an anomaly event in response to the simulated identified vehicle operation over the second route segment.

The method then provides 650 a driver alert indicative of the anomaly event while controlling the identified vehicle over the first route segment. The driver alert may be indicative of a location of the anomaly event and or a probability of the anomaly event. Prediction of the anomaly event may be performed by determining a probability of the anomaly event and comparing the probability to a threshold level wherein the probability exceeds the threshold level.

The method may further include receiving 660 an updated or continuous anomaly event data indicative of a prior anomaly event within the predicted route segment and wherein the anomaly event is predicted in response to the prior anomaly event, the identified vehicle location, and an identified vehicle speed. The event data may be a simulation model for predicting an anomaly event wherein the model was generated in response to crowdsourced ADAS operational state transitions compiled from a plurality of vehicles. In an exemplary embodiment, the anomaly event may be predicted in response to a machine learning model and the identified vehicle location and an identified vehicle speed. In another exemplary embodiment, the anomaly event is predicted in response to the machine learning model generated in response to a plurality of prior anomaly events within the second route segment. The predicting of the anomaly event may further be performed in response to map data, the identified vehicle location, and an identified vehicle speed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An apparatus comprising:
   a processor at an edge server in communication with one or more vehicles in a fleet operative to:
      communicate and maintain a continuous communication link between one or more vehicles of the fleet to receive a plurality of messages wherein the plurality of messages comprises a continuous stream of message data which includes data of state transitions of Electronic Control Units (ECUs) contained in each vehicle in a fleet of vehicles while executing vehicular operations in a vicinity;
      monitor in real-time the streamed message data from each vehicle for detection of updates of data about state transitions of ECUs used in the vehicular operations wherein the data of each state transition of the ECUs is reported by an advanced driver assistance system (ADAS) contained in each vehicle to the edge server;
   crowdsource in real-time a set of data of the state transitions of ECUs transitions or of varying levels of operations of ECUs during the vehicular operations of each vehicle in communication with the edge server to group together state transition data having a degree of commonality as crowdsource transition data;
      process, by application of a machine learning model, the crowdsource transition data, to classify crowdsource transition data indicative of an assisted driving system anomaly event; and transmit, in advance, a message to an identified vehicle likely to incur the assisted driving system anomaly event in order for a driver or ADAS to execute a response.

2. The apparatus of claim 1, further comprising:
the processor at the edge server in communication with the one or more vehicles in a fleet further operative to:
simulate an assisted driving system algorithm over a predicted route segment for an identified vehicle to generate a simulation result; and
predict a predicted assisted driving system anomaly event within the predicted route segment based on an analysis of the crowdsourced data and the simulation result.

3. The apparatus of claim 2, further comprising:
the processor at the edge server in communication with the one or more vehicles in a fleet further operative to:
send a user alert of the predicted assisted driving system anomaly event before the identified vehicle while executing vehicular operations incurs the predicted assisted driving system anomaly event.

4. The apparatus of claim 3, further comprising:
the processor at the edge server in communication with the one or more vehicles in a fleet further operative to:
broadcast a warning message in response to the predicted assisted driving system anomaly event to vehicles in the vicinity.

5. The apparatus of claim 4, further comprising:
the processor at the edge server in communication with the one or more vehicles in a fleet further operative to:
monitor one or more key parameters related to vehicular operations of each vehicle in the fleet.

6. The apparatus of claim 5 wherein the identified vehicle likely to incur the assisted driving system anomaly event is traveling behind a vehicle that has already incurred the assisted driving system anomaly event.

7. The apparatus of claim 6, further comprising:
the processor at the edge server in communication with the one or more vehicles in a fleet further operative to:
receive transition state data indicative of a prior assisted driving system anomaly event of a vehicle of the fleet traveling a route segment in the vicinity and wherein the assisted driving system anomaly event is predicted based on or in response to the prior assisted driving system anomaly event.

8. The apparatus of claim 7 wherein the message data is transmitted via an MQ Telemetry Transport (MQTT) and a Data Distribution Service (DDS) wireless protocol on a cellular network.

9. The apparatus of claim 8, further comprising:
the processor at the edge server in communication with the one or more vehicles in a fleet further operative to:
send via a reverse path the message about the assisted driving system anomaly event by to the cellular protocol to a messaging client at the vehicle to transmit on a Controller Area Network (CAN) bus to an ADAS controller of the vehicle to perform a control action on an ECU contained in the vehicle.

10. The apparatus of claim 8, wherein the degree of commonality comprises at least of a vehicle location and vehicle speed towards an assisted driver system anomaly event location.

11. A method performed by a processor comprising:
communicating a plurality of messages between a processor at an edge server and one or more vehicles in a fleet;
maintaining a continuous cellular link between the processor at the edge server and the one or more vehicles of a fleet for receiving the plurality of messages wherein the plurality of messages comprise a continuous stream of message data which includes data of state transitions of ECUs contained in each vehicle in a fleet of vehicles during vehicular operations;
monitoring in real-time the streamed message data from each vehicle for detection of updates of data about state transitions of ECUs used in the vehicular operations wherein the data of each state transition of the ECUs is reported by an advanced driver assistance system (ADAS) contained in each vehicle to the edge server;
crowdsourcing in real-time a set of data of the state transitions or of various levels of operations of ECUs during the vehicular operations of each vehicle in communication with the edge server to group together state transition data having a degree of commonality as crowdsource transition data;
processing, by application of a machine learning model, the crowdsource transition data, for classifying crowdsource transition data indicative of an assisted driving system anomaly event; and
transmitting, in advance, a message to an identified vehicle likely to incur the assisted driving system anomaly event in order for a driver or ADAS to execute vehicle control action.

12. The method of claim 11, further comprising:
simulating by the processor, an assisted driving system solution over a predicted route segment for an identified vehicle to generate a simulation result; and
predicting a predicted anomaly event within the predicted route segment in response to the crowdsource data and the simulation result.

13. The method of claim 12, further comprising:
sending a driver alert of the predicted anomaly event before the identified vehicle incurs the predicted anomaly event wherein the driver alert is indicative of a probability of the predicted anomaly event.

14. The method of claim 13, further comprising:
broadcasting, via a cellular network by the processor, a warning message in response to the predicted anomaly event to vehicles in the vicinity.

15. The method of claim 14, further comprising:
monitoring one or more key parameters related to vehicular operations of each vehicle in the fleet.

16. The method of claim 15 wherein the identified vehicle likely to incur the anomaly event is traveling behind a vehicle that has already incurred the anomaly event.

17. The method of claim 16, further comprising:
receiving transition state data indicative of a prior anomaly event of a vehicle of the fleet traveling a route segment in the vicinity and wherein the anomaly event is predicted in response to the prior anomaly event.

18. The method of claim 17 wherein the message data is transmitted via an MQTT and a DDS wireless protocol on a cellular network.

19. The method of claim 18, further comprising:
sending via a reverse path the message by the processor about the anomaly event by the cellular protocol to a messaging client at the vehicle to transmit on a CAN bus to an ADAS controller of the vehicle to perform a control action on an ECU contained in the vehicle.

20. An advanced driver assistance system for controlling a vehicle comprising:
a processor at an edge server in communication with one or more vehicles in a fleet operative to:
communicate and maintain a continuous communication link between one or more vehicles of a fleet to receive a plurality of messages wherein the plurality of messages comprises a continuous stream of message data which includes data of state transitions of ECUs contained in each vehicle in a fleet of vehicles while executing vehicular operations in a vicinity;

monitor in real-time the streamed message data from each vehicle for detection of updates of data about state transitions of ECUs used in the vehicular operations wherein the data of each state transition of the ECUs is reported by an advanced driver assistance system (ADAS) contained in each vehicle to the edge server;

crowdsource in real-time a set of data of the state transitions or of various levels of operations of ECUs during the vehicular operations of each vehicle in communication with the edge server to group together state transition data having a degree of commonality as crowdsource transition data wherein the degree of commonality comprises at least the vehicle location, vehicle speed towards the vicinity of the anomaly location;

process, by application of a machine learning model, the crowdsource transition data, to classify crowdsource transition data indicative of an assisted driving system anomaly event; and transmit, in advance, a message to an identified vehicle likely to incur the assisted driving system anomaly event in order for a driver or ADAS to execute a response.

* * * * *